Dec. 18, 1951  W. H. WORTHINGTON  2,579,134
VALVE CONTROL MEANS FOR FLUID PRESSURE SYSTEMS
Filed March 31, 1948  2 SHEETS—SHEET 2

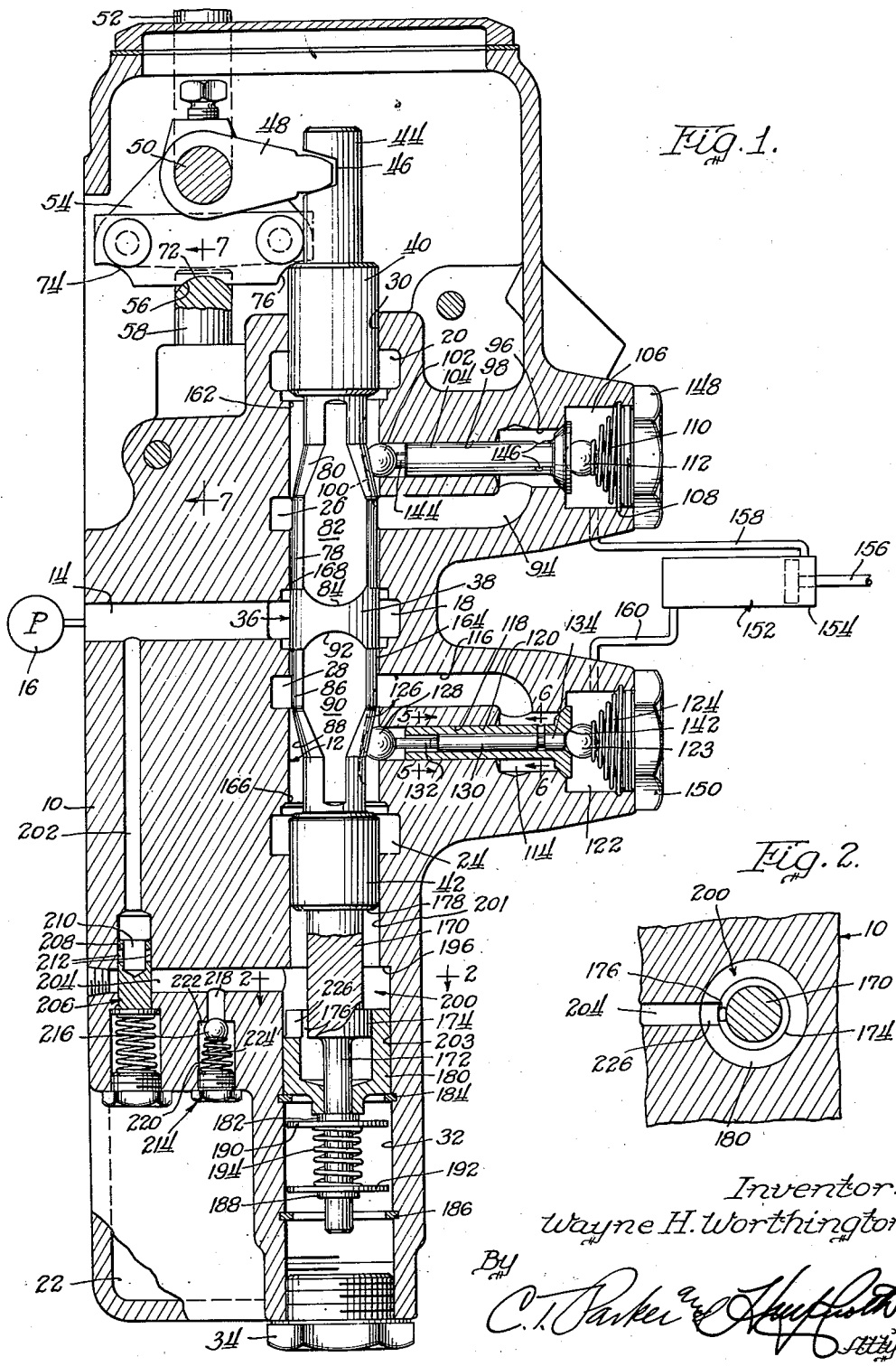

Inventor:
Wayne H. Worthington
By
C. T. Parker
Attys.

Patented Dec. 18, 1951

2,579,134

UNITED STATES PATENT OFFICE 2,579,134

VALVE CONTROL MEANS FOR FLUID PRESSURE SYSTEMS

Wayne H. Worthington, Waterloo, Iowa, assignor to Deere Manufacturing Co., Dubuque, Iowa, a corporation of Iowa Application March 31, 1948, Serial No. 18,198

5 Claims. (Cl. 137—144)

1

This invention relates to a fluid pressure system and more particularly to a valve control means therefor.

The invention contemplates and has for its principal object the provision of means for automatically returning the control valve to neutral position in response to fluid pressure in excess of a predetermined value. The invention is particularly adapted for use in connection with hydraulic systems of the type used on agricultural tractors for raising and lowering or otherwise adjusting implements connected to the tractor. In systems of this type, it is common practice to provide valve control means operated by a pressure relief valve which functions in response to excess pressure to return the control valve to neutral so that the application of fluid pressure to the working cylinder or motor is discontinued. It is the main object of the present invention to provide control means that is an improvement over existing systems and to provide such means in the form of a pair of relatively movable, axially shiftable pistons operably connected to the shiftable valve and deriving fluid pressure from a fluid pressure inlet under control of the excess pressure or relief valve. In some prior constructions in which fluid pressure means were used to operate directly on the control valve, it was necessary to provide a piston at each end of the valve and consequently to provide a pair of fluid pressure inlets therefor. In other types of systems, the pressure derived from the relief valve was used to operate mechanical linkage which in turn mechanically operated the means for controlling the valve. According to the present invention, the general organization is simplified by the use of piston means at one end only of the valve.

Another object of the invention is to provide improved relief valve means including primary and secondary relief valves for the purpose of diverting to the reservoir all fluid pressure in excess of that used to operate the means for returning the control valve to neutral. It is another object of the invention to provide simplified control means for the valves, particularly an improved and simplified connection for holding the valve in either of a pair of actuating or "on" positions, one of which may correspond to the functioning of the system in raising an implement, for example, and the other of which may correspond to the functioning of the system in lowering such implement.

In the adjusting of agricultural implements mounted on or connected to tractors, it is desirable that the fluid pressure system permit either fast or slow raising or lowering and for this purpose it has heretofore been known to provide a check valve of the poppet type incorporating therein a slidable valve of the piston type and to control this check valve so that the initial movement of the control valve will open the piston valve to permit restricted exhaust of fluid pressure, the control valve being provided with means for ultimately opening the valve to its fullest extent to provide for rapid exhaust of fluid pressure. Another object of the invention pertains to the provision of an improved valve construction of the type referred to, wherein the piston valve is interchangeable from end-to-end to provide a selection of means for metering or restricting the fluid pressure exhaust.

In connection with the operation of a system by which the operator has a choice of either fast or slow functioning, it is desirable that the means inludes some sort of mechanism which will indicate to the operator the position of the control valve in connection with the change from slow operation to fast operation. In some known constructions, this device is incorporated in the control lever in the form of a cam element and detent means which functions because of increased pressure on the detent to indicate to the operator to change from slow phase to fast phase. According to the present invention, it is an object to provide such means in connection with the piston means that functions to return the control valve to a neutral or to "off" position intermediate the two "on" positions.

The foregoing and other important and desirable objects and features inherent in and encompassed by the invention will become apparent to those skilled in the art as a disclosure is more fully made of a preferred form of the invention in the following detailed description and accompanying sheets of drawings, in which Figure 1 is a sectional view of a control valve assembly, with diagrammatic illustrations of a pump and fluid motor associated with this assembly;

Figure 2 is a fragmentary transverse section taken on the line 2—2 of Figure 1 and illustrating the relationship between parts of the control system assembly;

Figure 3:
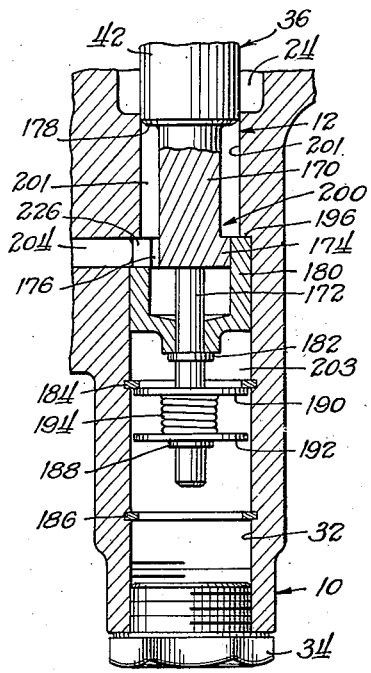
Figure 3 is a fragmentary view of the portion of the structure shown in Figure 1, with the parts illustrated in the positions they will occupy when the control valve is shifted upwardly.

The invention is disclosed herein primarily as an adaptation thereof for the purpose of improving the construction disclosed and claimed in assignee's co-pending application, Serial No. 626,626, filed November 5, 1945 by Jirsa et al., which issued on December 5, 1950 as Patent No. 2,532,552. It will be understood, of course, that the invention in its broader aspects may be adapted to other systems. Therefore, the illustration should be taken as an example of one application of the invention, and not as excluding other and modified forms thereof.

In the drawings, the numeral 10 designates a control valve housing provided with a vertical valve bore 12. The housing is provided substantially centrally thereof with a fluid pressure inlet 14 by means of which fluid may be supplied, as by a pump 16, to an annular port 18 in communication with the bore 12. The bore 12 communicates adjacent its upper end with an enlarged annular low pressure or exhaust port 20 which is in communication (by means not shown) with a fluid reservoir 22 preferably formed as part of the housing 10. A lower portion of the valve bore 12 is similarly in communication with a second low pressure or exhaust port 24, which likewise is in communication with the reservoir 22.

The housing 10 is provided with upper and lower annular discharge ports 26 and 28, respectively, these being in communication with the valve bore 12 above and below the inlet port 18. The valve bore 12 opens upwardly and outwardly at 30 at an upper portion of the housing and at a lower portion of the housing extends into an enlarged counterbore 32 which is closed at the bottom of the housing by a screw-threaded plug 34.

The housing carries for vertical reciprocation in the valve bore 12 a main or control valve, indicated generally by the numeral 36. This valve includes a central substantially cylindrical portion 38, an upper integral cylindrical or spool portion 40, and a similar lower spool portion 42. In the central or "off" position of the valve 36, the portion 38 is within the inlet port 18 and the spool portions 40 and 42 are respectively within the exhaust ports 20 and 24. The upper portion of the valve 36 is provided with an integral axial extension 44 which is notched at 46 to provide a gear-tooth connection with a control arm 48 fast on a transverse rockshaft 50. The rockshaft 50 may be rocked in either direction by a control lever 52 for moving the valve 36 either upwardly or downwardly at the will of the operator. The rockshaft 50 has also secured thereto a generally triangular cam plate 54 which has a central notch 56 normally engaged by the edge of a detent plunger 58. This plunger is carried in a housing portion 60 by means of a vertical bore 62, yieldable means in the form of a compression spring 64, and a guiding sleeve 66 carried in the bore 62. The detent head is provided with a slot 68 within which the lower edge of the cam plate 54 is received. This construction provides at each side of the cam plate a projection 70 which confines the cam plate against tipping laterally with respect to the detent. Since the cam plate is secured to the rockshaft 50, the construction also prevents shifting of the rockshaft along its axis. The slotted portion of the detent head between the projection 70 is arcuate, as at 72, to fit the notch 56 in the bottom of the plate 54.

The plate is further provided with a pair of lower end portions 74 and 76, each of which is preferably formed on an arc having the same radius as the arc 72. When the control lever 52 is moved to rock the rockshaft 50 in a counterclockwise direction, as viewed in Figure 1, the end portion 74 will engage the detent head 58; conversely, when the rockshaft is rocked in the other direction the end portion 76 will engage the detent head. In view of the straight or flat surface between the detent portions 74 and 76, there will be intermediate positions of the control or rockshaft 50 in which the detent will not positively hold the cam plate 54. In other words, the operator may move the control lever 52 to a limited extent in either direction without positively locking the lever in any definite position. Thereupon, the operator may release the lever 52 and the spring loading of the detent will tend to return the control lever to the position shown in Figure 1. The general functioning of the mechanism in this respect is similar to that obtainable in the structure disclosed in the co-pending application referred to above and is provided for the purpose of increasing the sensitivity of the control. However, when the control lever 52 is moved to either of its maximum positions, it will remain there until released either by the operator or by the return mechanism to be set forth below.

That portion of the valve 36 intermediate the cylindrical portion 38 and spool 40 is reduced in diameter at 78 and is tapered at 80, and these portions are ground off to provide a flat 82. The flat 82 is of sufficient length so as to be always in communication with the upper annular port 26, and the lower end of the flat is formed as an arc 84. The valve 36 is similarly formed between the portion 38 and the portion 42 with a reduced portion 86, a tapered portion 88, and a flat 90, the latter joining the intermediate portion 38 in an arc 92.

The upper annular port 26 communicates via a passage 94 with a check valve port 96. The latter is in communication with a reduced counterbore 98 opening to the vertical control valve bore 12 in the vicinity of the upper tapered valve portion 80. This portion of the valve is provided with a longitudinally running slot 100 that engages a ball 102 carried in the inner end of the counterbore 98. A hollow check valve 104 of the poppet type is slidably carried in the counterbore 98 and normally closes the port 96 off from a coaxial chamber 106. This chamber is internally formed with an annular groove 108 into which is snapped the outermost coil of a coil spring 110 to provide means against which the spring may react to hold a ball 112 against the head of the check valve 104.

Figure 5:
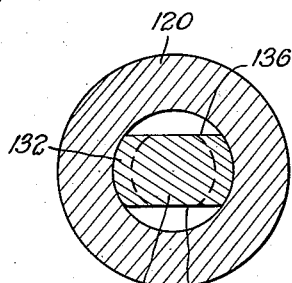
Figure 5 is an enlarged transverse sectional view showing the check valve and metering valve assembly as constructed at one end thereof, the view being taken on the line 5—5 of Figure 1.
Figure 7:
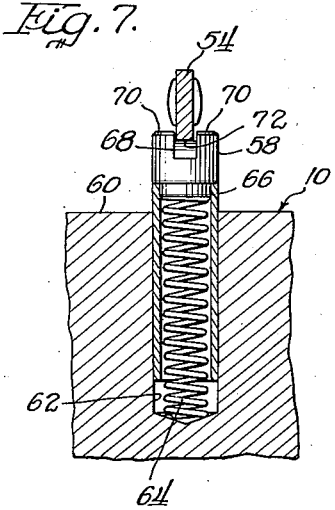
Figure 7 is a fragmentary transverse sectional view taken on the line 7—7 of Figure 1 and illustrating part of the detent control mechanism for the control valve.
Figure 6:
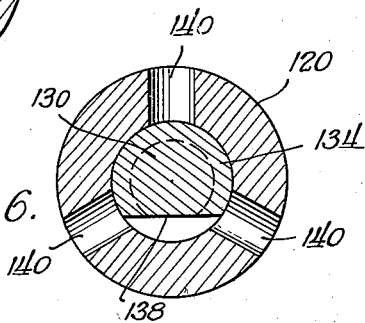
Figure 6 is a similar sectional view taken at the other end of the check valve assembly, as viewed along the line 6—6 of Figure 1.

The lower annular discharge port 28 is associated with structure that is symmetrical with that just described. The port is in communication with a check valve port 114 by means of a passage 116. The check valve port 114 is provided with a counterbore 118 in which is slidably carried a check valve 120 of the poppet type, for normally closing the check valve port off from a chamber 122 in which is provided a spring and ball assembly 123—124 similar to that described in connection with the check valve 104. The bore 118 opens to the valve bore 12 in the vicinity of the tapered portion 88 of the valve member 36. This portion of the valve member is provided with a longitudinally running slot or groove 126 which receives or engages a ball 128 positioned in the inner end of the bore 118. The check valve 120 is hollow and carries slidably therein a metering valve 130 which has inner and outer end portions 132 and 134. As best shown in Figure 5, the inner end portion 132 is ground off at each side at 136 to provide a pair of diametrically opposite flats. As best shown in Figure 6, the outer end 134 is ground off at only one side to provide a flat 138. The outer end portion of the check valve 120, just inwardly of its enlarged head, is provided with a plurality of radial bores or ports 140, certain of which may be communicated with the flat 138. The metering valve 130 may be changed end for end to dispose the inner end portion 132 at the outer end portion of the check valve so that the flats 136 provide means for communication between the port 140 and the check valve port 114. Regardless of which end of the metering valve is disposed outwardly, the opposite end is normally engaged by the ball 128; and the outer end engages the ball 123 of the spring and ball assembly 123—124, the head of the check valve being conically recessed at 142 to receive the ball. The ball 123 thus serves as means to seal the interior of the check valve 120 against communication between the valve port 114 and discharge chamber 122.

The construction of the other check valve 104 is similar to that just described and the inwardly projecting end of the metering valve is shown at 144 as engaging the ball 102. Radial ports in the check valve 104 are indicated at 146.

The discharge chambers 106 and 122 are appropriately closed by plugs 148 and 150, respectively, but the chambers are in communication with a fluid motor, indicated generally by the numeral 152. This motor is preferably of the two-way type and includes a cylinder 154 and a movable piston 156. The chamber 106 is communicated with one end of the cylinder 154 as by a fluid line 158. The other chamber 122 is connected by a line 160 to the other end of the cylinder.

From the description thus far it will be seen that the control valve 36 may be shifted in either direction from a central "off" position to either of a pair of "on" positions by means of the control lever 52 and rockshaft 50. Assuming that it is desired to operate the fluid motor 152 so that the piston 156 moves from right to left, as viewed in Figure 1, the control lever 52 will be rocked in a clockwise direction, resulting in downward shifting of the valve member 36. Assuming further that the control lever 52 is shifted to an extent less than that required to lock the cam plate 54 at point 76 with the detent 58, slow travel of the piston 156 from right to left will be obtained. When the control valve 36 is in its neutral or "off" position, as shown in Figure 1, fluid entering the high pressure port 14 enters the annular port 18 and escapes both upwardly and downwardly along the flats 82 and 90. Neither of the spool portions 40 or 42 closes off its associated exhaust port 20 or 24; consequently, the fluid is free to circulate back to the reservoir 22 at no appreciable pressure. Initial downward movement of the valve 36 results first in a closing off of the port 20 by the spool portion 40 of the valve, at 162; simultaneously, the arc 92 of the flat 90 moves past the lower edge of the annular port 18 and the cylindrical portion 38 cuts off the valve bore 12 at 164. Also simultaneously, the taper 126 cams the ball 128 outwardly in the bore 118 against the inner end of the metering valve 130, thus unseating the ball 123 from the seat 142 in the head of the check valve 120. Fluid exhausted from the left hand end of the cylinder 154 through the line 160 enters the chamber 122 and may pass by the metering flat 138 and through the ports 140 in the check valve 120 into the check valve port 114, thence through the passage 116, into the port 28, along the flat 90 to the port 24 and from there to the reservoir 22. At the same time, the rise in pressure along the flat 82 and through the port 26 and passage 94 forces the check valve 104 open against its spring 110, whereupon fluid pressure is transmitted through the chamber 106 and through the line 158 to the right hand end of the cylinder 154, thus moving the piston 156 from right to left.

Initial movement of the valve 36 downwardly serves merely to open the metering valve 130 in the check valve 120. Continued downward movement of the control valve 36 ultimately effects opening of the check valve 120 itself, thus permitting the more rapid exhaust of fluid pressure from the fluid motor 152, giving to the operator a fast exhaust as compared with a relatively slow exhaust obtainable upon initial movement of the valve 36.

Reversal of the operation of the fluid motor 152 may be obtained by rocking the control lever 52 in a counterclockwise direction, which moves the control valve 36 upwardly and effects exhaust of the fluid motor through the chamber 106, check valve port 96, passage 94 and port 26 to the reservoir 22. Fluid under pressure will be transmitted from the fluid pressure inlet 14, through the port 18, along the flat 90, to the passage 116 and ultimately to the fluid motor through the check valve port 114, chamber 122 and fluid line 160. It will be understood that when the valve moves upwardly, the spool portion 42 cuts off the valve port 12 at 166 and the cylindrical portion 38 ultimately cuts off the port 18 at 168.

As previously stated, the lower portion of the control valve bore 12 opens into a counterbore 32. The control valve 36 is provided with means preferably in the form of an integral axial extension 170, of reduced diameter with respect to the bottom end of the spool portion 42. The extension 170 is still further reduced to provide an integral extending rod portion 172 and is further enlarged intermediate its ends to provide a head 174. The head 174 is slotted or notched in an axial direction at 176. The shoulder formed at the junction between the bottom face of the spool portion 42 and the extension 170 provides a piston, designated by the numeral 178. The extension 170 carries a second piston 180 preferably in the form of a centrally bored cup slidably carried on the rod portion 172. The inside diameter of the cup is such as to slidably fit the head 174 and the outside diameter thereof is such as to slidably fit the counterbore 32.

The connection between the piston 178 and 180 is of the one-way type so that they may move together in one direction and may have limited relative movement in either direction. Movement of the piston 180 toward the piston 178 is stopped by the head 174, which contacts the face of the cup member 180. Movement of the member 180 away from the piston 178 is stopped by a snap ring 182 carried by the rod 172. Downward movement of the piston 180 is further controlled or stopped by a stop or snap ring 184 carried by the housing coaxial with the counterbore 32. A second and similar snap ring 186 is carried by the counterbore portion of the housing in axially spaced relation to the snap ring 184. The lowermost end of the rod 172 is fitted with a second stop or snap ring 188 which may be similar to the small snap ring 182 previously described. Resilient mechanism is interposed between the stop rings 182 and 188 and preferably comprises an upper washer 190, a lower washer 192 and a coiled compression spring 194.

As best shown in Figure 3, when the control valve 36 is moved upwardly, the piston 180 moves with it, the piston being stopped at 196 by means of the annular shoulder formed in the valve bore 12 and the counterbore 32. The piston 180 is carried with the valve 36 by means of the snap ring 182 on the rod 172. At the same time, the upper washer 190 engages the upper large snap ring 184, thus effecting compression of the coil spring 194 between the upper washer 190 and the lower washer 192.

Figure 4:
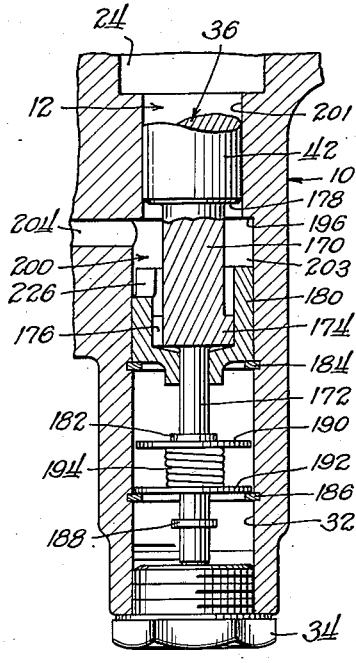
Figure 4 is a similar view showing the position of the parts when the control valve is shifted downwardly.

When the control lever 52 is rocked in a clockwise direction to move the valve member 36 downwardly, the parts start out from the position shown in Figure 1 and end up in the position shown in Figure 4. Initial downward movement of the valve member 36 causes axial downward movement, of course, of the extension 170, which movement is relative to the piston 180, since the latter is at its lowermost position, as defined by the upper stop or snap ring 184. Before the head 174 is engaged and stopped against the interior or base of the cup piston 180, the lower washer 192 will have engaged the lower snap ring 186; and further movement downwardly of the valve member 36 will effect compression of the spring 194, final downward movement of the valve member 36 being determined by engagement of the lower end of the piston 180 with the upper snap ring 184 (Figure 4).

The proximate portions of the valve bore 12 and counterbore 32 within which the pistons 178 and 180 operate constitute a fluid pressure chamber which is here designated by the numeral 200 and having a small cylinder 201 and a larger cylinder 203. The piston 178 and cylinder 201 thus provide a fluid motor, as do the piston 180 and cylinder 203. Means is provided for transmitting fluid under pressure to the chamber 200 in response to certain working conditions determined by the fluid motor 152 or the implement or other structure to which it is attached. This means preferably takes the form of a pair of angularly related fluid passages or conduits 202 and 204, the former of which may communicate with the high pressure inlet port 14 to provide a by-pass passage and the latter of which may communicate with the chamber 200 just referred to. The passage 202 is provided with a spring-loaded excess pressure relief valve designated generally by the numeral 206. This valve may be of any conventional construction and is shown here as a plunger 208 having a central bore 210 open to the passage 202 and a pair of radial bores 212 which may be at times placed in communication with the transverse passage 204. The position of the plunger shown in Figure 1 is its normal position. The valve 206 constitutes a primary relief valve in conjunction with which a secondary relief valve 214 operates. The secondary valve may include a spring loaded ball valve 216 which normally closes a short passage 218 in communication with the transverse passage 204. The normal position of the ball 216 is maintained by a relatively light spring 220. The passage 218 is thus normally closed off from a chamber 222 which may communicate as by a passage 224 with the reservoir 22. The arrangement is such that excess pressure developed in the system will effect transmission of fluid under pressure through the passages 202 and 204 to the chamber 200. However, as will be hereinafter pointed out, the excess pressure resulting in opening of the primary relief valve 206 further operates to open the secondary relief valve 214, so that only part of the excess pressure is delivered to the chamber 200 and the remainder is returned through the chamber 222 and passage 224 to the reservoir 22.

The cup portion of the piston 180 is notched or ported at 226 to communicate with the inner end of the passage 204 at such time as said piston is in its upward position (Figure 3).

The operation of the valve control system in general has been set forth above, particularly in connection with the movement of the piston 156 in the cylinder 154 of the hydraulic motor 152. Likewise, operation of the detent control means 44—76 has been set forth above, as has been the interchangeability of the metering valve 130.

The operation of the means for returning the control valve to neutral operates as follows. When the parts are in their neutral or "off" position, the control valve 36 is centered, as in Figure 1. Both relief valves 206 and 214 are closed, and there is no circulation of fluid pressure to the chamber 200. The piston 180 is in its lowermost or normal position, at its maximum distance from the piston 178, as determined by the upper, large snap ring 184, which provides stop means for the piston. When the control lever is moved to its maximum position in a counterclockwise direction to raise the valve member 36 and supply fluid under pressure to the left hand end of the fluid motor 152, the snap ring 182 on the rod 172 engages the bottom of the piston 180 and moves or displaces this piston upwardly along with the valve member 36 and piston 178, so that the parts assume the positions shown in Figure 3. If the control member 52 is rocked only slightly in a counterclockwise direction, the same result is obtained so far as movement of the pistons 178 and 180 is concerned; however, as the cam plate 54 approaches the position in which the end 74 thereof is about to engage the edge of the detent 58, the upper washer 190 of the resilient means will have engaged the underside of the snap ring 184. Further upward movement of the valve 36 will be resisted by the spring 194, the latter being compressed between the washers 190 and 192. The operator will feel this increased resistance and will know that he has reached the end of slow-phase operation and that if he moves the control lever 52 further in a counterclockwise direction, he will enter upon fast-phase operation. The resilient means thus provides mechanism for indicating to the operator the transition between slow-phase and fast-phase operation. It will be appreciated that initial movement of the valve member 36 and piston 180 upwardly will cause a slight rise in pressure in the chamber 200. However, the spring 220 on the secondary relief valve 214 is relatively light and will permit the ball 216 to become unseated from the end of the passage 218 to an extent sufficient to accommodate the increase in pressure.

When the valve 36 and pistons 178 and 180 are moved upwardly to their maximum position, as shown in Figure 3, fluid is being delivered through the passage 116 and line 160 to the left hand end of the fluid motor 152, and the control lever will be maintained in its maximum position by means of the detent mechanism previously described. Now, when the piston 156 reaches the right hand limit of its stroke, or when movement of the piston to the right is otherwise impeded, the pressure in the system will rise to an extent sufficient to open the relief valve 206, thus shifting the relief valve plunger 208 downwardly to align the ports 212 with the transverse passage 204, whereupon fluid pressure will flow into the transverse passage 204 and thence into the chamber 200. When the parts are in the position shown in Figure 3, fluid pressure enters from the passage 204 into the chamber 200 by means of the port 226 in the piston 180. Since the area of the piston 178 is smaller than the total area presented to fluid pressure by the piston 180, the latter will move downwardly, carrying with it (because of the snap ring 182) the piston 178 and the entire valve assembly 36. The fluid pressure thus developed is sufficient to overcome the locking action of the detent mechanism, and, as the valve 36 moves downwardly, the control lever 52 is released and the parts returned to their "off" position, as shown in Figure 1. All fluid pressure in excess of that required to move the piston 180 downwardly is exhausted to the reservoir through the secondary relief valve 214. Return of the valve member 36 to its "off" position ultimately diverts fluid pressure back to the reservoir through the ports 20 and 24 and no further excess pressure will be developed or the relief valves 206 and 214.

When the control lever 52 is rocked in a clockwise direction to only a limited extent, the operator has the same "feel" created by the resilient means, since the washer 192 engages the upper side of the lower snap ring 186 as the parts approach the positions of Figure 4. In this instance, the piston 180 remains in its starting position as determined by the upper snap ring 184. The valve 30 and piston 178 may move downwardly toward the piston 180 until the extreme lower end of the extension rod 172 strikes the inner end of the lower plug 34, which occurrence may be simultaneous with the engagement of the head 174 on the extension 170 with the interior or base of the cup shaped piston 180.

With the parts in their positions as indicated in Figure 4, the piston 156 will move from right to left in the cylinder 154. Upon the occasion of the piston 156 reaching the end of its stroke or being otherwise impeded in its travel, fluid pressure will rise and will be transmitted through the passages 202 and 204 to the chamber 200, in a manner similar to that previously described. Fluid pressure entering the chamber 200 will react against the now stationary piston 180 and will force the valve 36 upwardly by pressure on the piston portion 178. The valve 36 will return to its neutral or "off" position and the fluid pressure will fall off, since the pump will then circulate fluid back to the reservoir through the ports 20 and 24 in the usual manner.

As previously stated, the foregoing relates to a preferred embodiment of the invention and only the most important objects and features of the invention have been set forth. It will be appreciated that other objects and features of the invention will suggest themselves to those skilled in the art, as likewise will several modifications and alterations in the preferred form illustrated, all of which may be accomplished without departing from the spirit and scope of the invention as set forth in the appended claims.

What is claimed is:

1. In a fluid pressure system having control valve mechanism shiftable from an intermediate neutral position to either of two actuating positions, said system further including a relief-valve-controlled passage for by-passing excess fluid pressure, the improvement residing in means for automatically returning the control valve mechanism to neutral from either of its actuating positions in response to excess fluid pressure, comprising: housing means including a chamber provided with a first cylinder and a second larger cylinder and fluid conducting means therebetween; a piston reciprocable in the first cylinder in either direction away from an intermediate normal position; means connecting the piston to the control valve mechanism for reciprocation of the piston in either direction away from its normal position in accordance with shifting of said control valve mechanism; a piston in the second cylinder reciprocable therein between a normal position and a displaced position; means operably interconnecting the pistons including a one-way connecting device so constructed and arranged that movement of the first piston in one direction away from its normal position displaces the second piston and return of the second piston to its normal position returns the first piston to its normal position, and so that movement of the first piston in the opposite direction away from its normal position is relative to the second piston; and means including a fluid conduit connected to the aforesaid by-pass passage and to the chamber for supplying fluid pressure to the chamber between the pistons effective to move the pistons conjointly in one direction and relatively in the opposite direction, depending upon the positions of the pistons as determined by positioning of the control valve mechanism.

2. In a fluid pressure system having control valve mechanism shiftable from an intermediate neutral position to either of two actuating positions, said system further including a relief-valve-controlled passage for by-passing excess fluid pressure, the improvement residing in means for automatically returning the control valve mechanism to neutral from either of its actuating positions in response to excess fluid pressure, comprising: housing means including a chamber provided with a first cylinder and a second larger cylinder disposed coaxially in end-to-end and fluid transfer relationship; a piston reciprocable in the first cylinder selectively toward or away from the second cylinder from an intermediate normal position; means connecting said piston to the control valve mechanism for such reciprocation in accordance with shifting of said control valve mechanism as aforesaid; a piston reciprocable in the second cylinder from a normal position to a displaced position toward the first cylinder; means cooperable between the second cylinder and second piston providing a stop fixing the limit of movement of said second piston away from the first cylinder; means extending axially between and operably interconnecting the pistons including a one-way connecting device so constructed and arranged that movement of the first piston from its normal position and away from the second cylinder will displace the second piston in the same direction and return of the second piston to its normal position will return the first piston to its normal position, and so that movement of the first piston from its normal position and toward the second cylinder and return will be relative to the second piston; and fluid-conducting means connected to the aforesaid by-pass passage and communicating with the chamber between the pistons for supplying fluid pressure to move the second piston from displaced position to normal position and to react against the stopped second piston in its normal position to move the first piston in the direction away from the second cylinder and back to its normal position.

3. In a fluid pressure system having control valve mechanism shiftable from an intermediate neutral position to either of two actuating positions, said system further including a relief-valve-controlled passage for by-passing excess fluid pressure, the improvement residing in means for automatically returning the control valve mechanism to neutral from either of its actuating positions in response to excess fluid pressure, comprising: housing means including a chamber provided with a first cylinder and a second larger cylinder disposed coaxially in end-to-end and fluid transfer relationship; a piston reciprocable in the first cylinder selectively toward or away from the second cylinder from an intermediate normal position; means connecting said piston to the control valve mechanism for such reciprocation in accordance with shifting of said control valve mechanism as aforesaid; a piston reciprocable in the second cylinder from a normal position to a displaced position toward the first cylinder; means cooperable between the second cylinder and second piston providing a stop fixing the limit of movement of said second piston away from the first cylinder; means providing an aperture through the second piston; a rod secured to the first piston and extending axially and slidably through said aperture and axially beyond said second piston; means on the rod on a portion thereof axially beyond the second piston and engageable with said second piston to provide a one-way connection between the pistons so that movement of the first piston from its normal position and away from the second cylinder will displace the second piston in the same direction and return of the second piston to its normal position will return the first piston to its normal position, and so that movement of the first piston from its normal position and toward the second cylinder return will be relative to the second piston; and fluid-conducting means connected to the aforesaid by-pass passage and communicating with the chamber between the pistons for supplying fluid pressure to move the second piston from displaced position to normal position and to react against the stopped second piston in its normal position to move the first piston in the direction away from the second cylinder and back to its normal position.

4. In a fluid pressure system having a housing provided with a valve bore in which a valve plunger is shiftable from an intermediate neutral position to either of two actuating positions, said system also including a relief-valve-controlled passage for by-passing excess fluid pressure, the improvement residing in means for automatically returning the valve plunger to neutral position from either of its actuating positions in response to excess fluid pressure in the system, comprising: means including a coaxial continuation of said valve bore providing a first cylinder; a second larger cylinder arranged coaxially of and in end-to-end relationship with the first cylinder, the two cylinders thus being open to each other and providing a fluid chamber; means including an end portion of the valve plunger providing a first piston reciprocable in the first cylinder from a normal position, when the valve plunger is in neutral position, either toward or away from the second cylinder when said valve plunger is shifted respectively to its actuating positions; a piston reciprocable in the second cylinder from a normal position to a displaced position toward the first cylinder; means cooperable between the second cylinder and second piston providing a stop fixing the limit of movement of said second piston away from the first cylinder; means extending axially between and operably interconnecting the pistons including a one-way connecting device so constructed and arranged that movement of the first piston from its normal position and away from the second cylinder will displace the second piston in the same direction and return of the second piston to its normal position will return the first piston to its normal position, and so that movement of the first piston from its normal position and toward the second cylinder and return will be relative to the second piston; and fluid-conducting means connected to the aforesaid by-pass passage and communicating with the chamber between the pistons for supplying fluid pressure to move the second piston from displaced position to normal position and to react against the stopped second piston in its normal position to move the first piston in the direction away from the second cylinder and back to its normal position.

5. In a fluid pressure system having a housing provided with a valve bore in which a valve plunger is shiftable from an intermediate neutral position to either of two actuating positions, said system also including a relief-valve-controlled passage for by-passing excess fluid pressure, the improvement residing in means for automatically returning the valve plunger to neutral position from either of its actuating positions in response to excess fluid pressure in the system, comprising: means including a coaxial continuation of said valve bore providing a first cylinder; means including an end portion of the valve plunger providing a piston reciprocable in the first cylinder in either direction away from an intermediate normal position; means including a second, larger cylinder proximate to the first; means interconnecting said cylinders in fluid transfer relationship so that said cylinders provide in effect a fluid chamber; a piston in the second cylinder reciprocable therein between a normal position and a displaced position; means operably interconnecting the pistons including a one-way connecting device so constructed and arranged that movement of the first piston in one direction away from its normal position displaces the second piston and return of the second piston to its normal position returns the first piston to its normal position, and so that movement of the first piston in the opposite direction away from its normal position is relative to the second piston; and means including a fluid conduit connected to the aforesaid by-pass passage and to the chamber for supplying fluid pressure to the chamber between the pistons effective to move the pistons conjointly in one direction and relatively in the opposite direction, depending upon the positions of the pistons as determined by positioning of the control valve plunger.

WAYNE H. WORTHINGTON.

REFERENCES CITED

The following references are of record in the file of this patent:

UNITED STATES PATENTS

| Number | Name | Date |
| --- | --- | --- |
| 769,111 | Pierce | Aug. 30, 1904 |
| 2,184,793 | Clench | Dec. 26, 1939 |
| 2,342,450 | Campbell | Feb. 22, 1944 |
| 2,355,758 | Stevens | Aug. 15, 1944 |
| 2,387,007 | Buchanan | Oct. 16, 1945 |
| 2,403,519 | Gardiner | July 9, 1946 |
| 2,451,730 | Greenlee | Oct. 19, 1948 |